US008687530B2

(12) United States Patent
Luo et al.

(10) Patent No.: US 8,687,530 B2
(45) Date of Patent: Apr. 1, 2014

(54) STATEFUL SCHEDULING WITH NETWORK CODING FOR ROADSIDE-TO-VEHICLE COMMUNICATION

(75) Inventors: Chong Luo, Beijing (CN); Han Cheng Lu, Hefei (CN); Wei Pu, Hefei (CN); Feng Wu, Beijing (CN); Chang Wen Chen, East Amherst, NY (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 12/117,756

(22) Filed: May 9, 2008

(65) Prior Publication Data

US 2009/0279462 A1 Nov. 12, 2009

(51) Int. Cl.
*H04B 7/00* (2006.01)
*H04B 7/216* (2006.01)

(52) U.S. Cl.
USPC .......................................... 370/310; 370/335

(58) Field of Classification Search
USPC .......................................................... 370/310
See application file for complete search history.

(56) References Cited

U.S. PATENT DOCUMENTS

| | | | |
|---|---|---|---|
| 6,028,537 A | 2/2000 | Suman et al. | |
| 6,795,846 B1 * | 9/2004 | Merriam | 709/203 |
| 6,959,173 B2 | 10/2005 | Kawai | |
| 7,173,917 B1 * | 2/2007 | Narayanan et al. | 370/331 |
| 2002/0047786 A1 | 4/2002 | Kasagi | |
| 2003/0055924 A1 * | 3/2003 | Matsugatani | 709/220 |
| 2003/0102997 A1 | 6/2003 | Levin et al. | |
| 2005/0137790 A1 | 6/2005 | Yamada et al. | |
| 2005/0174974 A1 | 8/2005 | Sonntag et al. | |
| 2005/0192018 A1 * | 9/2005 | Jang | 455/450 |
| 2007/0082658 A1 | 4/2007 | Tengler et al. | |
| 2007/0139168 A1 | 6/2007 | Rennie et al. | |
| 2008/0013515 A1 * | 1/2008 | Benveniste | 370/338 |
| 2008/0056182 A1 * | 3/2008 | Usuda et al. | 370/329 |
| 2008/0075080 A1 * | 3/2008 | Katabi et al. | 370/392 |
| 2008/0125049 A1 * | 5/2008 | Suzuki et al. | 455/63.1 |
| 2009/0147738 A1 * | 6/2009 | Larsson et al. | 370/329 |
| 2011/0176408 A1 * | 7/2011 | Sun | 370/216 |

FOREIGN PATENT DOCUMENTS

| | | |
|---|---|---|
| WO | 2005013500 A1 | 2/2005 |
| WO | 2007126147 A1 | 11/2007 |

OTHER PUBLICATIONS

Mansy et al, "Reliable Roadside-To-Roadside Data Transfer Using Vehicular Traffic", IEEE Internatonal Conference on Mobile Adhoc and Sensor Systems, 2007. MASS 2007, Oct. 8-11, 2007, pp. 1-6.
Yoon et al, "On "Shooting" a Moving Vehicle with Data Flows", 2007 Mobile Networking for Vehicular Environments, May 11-11, 2007, pp. 49-54.
Johnson et al, "Collaborative Content Distribution for Vehicular Ad Hoc Networks", Allerton Conf. Communication, Control, and Computing, Monticello, IL, Sep. 2006. pp. 1-10.
Aguayo et al, "Link-Level Measurements from an 802.11b Mesh Network", Session: Wireless and delay-tolerant networks, vol. 34 , Issue 4 (Oct. 2004), pp. 121-132.

(Continued)

*Primary Examiner* — Shaq Taha
(74) *Attorney, Agent, or Firm* — Gonzalez Saggio & Harlan LLP

(57) ABSTRACT

Described is a technology by which a roadside-to-vehicle communication system may be implemented, including via a stateful scheduling with network coding scheme that enhances network capacity. Moving vehicles request and receive data from a roadside access points. Each of the access points operate a stateful scheduling algorithm that serves multiple vehicles by integrating network coding within a timeslot. In one aspect, the state of each vehicle's previously received and retained data is obtained, and used to enhance network capacity by combining as many packets as possible for multiple recipients in network coding.

18 Claims, 7 Drawing Sheets

(56) References Cited

OTHER PUBLICATIONS

Ahlswede et al, "Network Information Flow", IEEE transactions on Information Theory, vol. 46, No. 4, Jul. 2000, pp. 1204-1216.
Balakrishnan et al, "A Comparison of Mechanisms for Improving TCP Performance over Wireless Links", Proc. ACM SIGCOMM '96, Stanford, CA, Aug. 1996, pp. 256-269.
Bhagwat et al, "Turning 802.11 Inside-Out", ACM SIGCOMM Computer Communication Review, Column: Papers from Hotnets-II, vol. 34, Issue 1, Jan. 2004, pp. 33-38.
Bicket et al, "Architecture and Evaluation of an Unplanned 802.11b Mesh Network", International Conference on Mobile Computing and Networking, Proceedings of the 11th annual international conference on Mobile computing and networking, Cologne, Germany, pp. 31-42.
Biswas et al, "Opportunistic Routing in Multi-Hop Wireless Networks", ACM SIGCOMM Computer Communication Review, vol. 34, Issue 1, Jan. 2004, Column: Papers from Hotnets-II, pp. 69-74.
Crovella et al, "Heavy-Tailed Probability Distributions in the World Wide Web", a practical guide to heavy tails: statistical techniques and applications, 1998, pp. 3-25.
De Couto, et al, "A High-Throughput Path Metric for Multi-Hop Wireless Routing", Wireless Networks, vol. 11, Issue 4 (Jul. 2005), Special issue: Selected papers from ACM MobiCom 2003, ages: 419-434.
Deb et al, "Network Coding for Wireless Applications", In Proc. of IWWAN, London, UK, May 2005, pp. 1-3.
Draves et al, "Comparison of Routing Metrics for Multi-Hop Wireless Networks", Proceedings of the 2004 conference on Applications, technologies, architectures, and protocols for computer communications, Oregon, USA, 2004, pp. 133-144.
Winner "Definition and Assessment of Relay Based Cellular Deployment Concepts for Future Radio Scenarios Considering 1st Protocol Characteristics", IST-2003-507581, D3.4 version 1.0, 30.06.2005, pp. 1-118.
Fu et al, "The Impact of Multihop Wireless Channel on TCP Throughput and Loss", INFOCOM 2003. Twenty-Second Annual Joint Conference of the IEEE Computer and Communications Societies, Mar.30-Apr. 3, 2003, vol. 3, pp. 1744-1753.
Heusse et al, "Idle Sense: An Optimal Access Method for High Throughput and Fairness in Rate Diverse Wireless Lans", ACM SIGCOMM Computer Communication Review, vol. 35, Issue 4 Oct. 2005, pp. 121-132.
Ho et al, "Online Incremental Network Coding for Multiple Unicasts", in DIMACS Working Group on Network Coding, Piscataway, NJ, USA, Jan. 2005, pp. 1-14.
Ho et al, "The Benefits of Coding over Routing in a Randomized Setting", Proceedings of IEEE International Symposium on Information Theory, 2003. Jun. 29-Jul. 4, 2003, pp. 1-6.
Ho et al, "On the Utility of Network Coding in Dynamic Environments", International Workshop on Wireless Ad-Hoc Networks, 2004, May 31-Jun. 3, 2004, pp. 196-200.
IEEE Std. 802.11-1999, Part 11: Wireless LAN Medium Access Control (MAC) and Physical Layer (PHY) specifications, Reference No. ISO/IEC 8802-11:1999(E), IEEE Std 802.11, 1999 edition, (1999), IEEE.
Jaggi et al, "Polynomial Time Algorithms for Multicast Network Code Construction", IEEE Transactions on Information Theory, vol. 51, No. 6, Jun. 2005, pp. 1973-1982.
Kamra et al, "Growth Codes: Maximizing Sensor Network Data Persistence", ACM SIGCOMM Computer Communication Review, Proceedings of the 2006 conference on Applications, technologies, architectures, and protocols for computer communications, pp. 255-266.
Karp "Geographic Routing for Wireless Networks", The Division of Engineering and Applied Sciences, Harvard University, Cambridge, Massachusetts, Oct. 2000, pp. 1-118.
Katti et al, "The Importance of Being Opportunistic: Practical Network Coding for Wireless Environments", In Proceedings of 43rd Allerton Conference on Communication, Control, and Computing, 2005, pp. 1-10.

Koetter et al, "An Algebraic Approach to Network Coding", IEEE/ACM Transactions on Networking, vol. 11, No. 5, Oct. 2003, pp. 782-795.
Morris et al, "The Click Modular Router", 17th ACM Symposium on Operating Systems Principles (SOSP '99), Published as Operating Systems Review 34(5), Dec. 1999, pp. 217-231.
Zhou, "Linear Network Coding", Dept. of Computer Science & Engineering, The Chinese Univ. of Hong Kong,Feb. 2005, pp. 1-30.
Lun et al, "Further Results on Coding for Reliable Communication over Packet Networks", International Symposium on Information Theory, 2005, Volume , Issue , Sep. 4-9, pp. 1848-1852.
Lun et al, "Achieving Minimum-Cost Multicast: A Decentralized Approach Based on Network Coding", INFOCOM 2005. 24th Annual Joint Conference of the IEEE Computer and Communications Societies. Proceedings IEEE, vol. 3, pp. 1607-1617.
Sinha et al, "Internet Packet Size Distributions: Some Observations", USC/Information Sciences Institute, Orignally released Oct. 2005 as web page \url{http://netweb.usc.edu/~rsinha/pkt-sizes/, May 2007.
Paxson et al, "Wide-Area Traffic: The Failure of Poissons Modeling", IEEE/ACM Transactions on Networking, vol. 3, Issue: 3, pp. 226-244.
Ramamoorthy et al, "On the Capacity of Network Coding for Wireless Networks", IEEE Transactions on Information Theory, vol. 51, No. 8, Aug. 2005, 2878-2885.
Sinha et al, "A Reliable Transport Protocol for Wireless Wide-Area Networks", Wireless Networks, Selected Papers from Mobicom'99, vol. 8, Nos. 2-3 / Mar. 2002, pp. 301-316.
"ttcp", http://ftp.arl.mil/ftp/pub/ttcp/.
"Wireless Community Network List", http://www.toaster.net/wireless/community.html.
Wu et al, "Information Exchange in Wireless Networks with Network Coding and Physical-layer Broadcast", 2005 Conference on Information Sciences and Systems, The Johns Hopkins University, Mar. 16-18, 2005, pp. 1-6.
Li et al "Network Coding in Undirected Networks", in Proc. 38th Annu. Confe. Information Sciences and Systems (CISS), Princeton, NJ, 2004, pp. 1-6.
Li et al, "Network Coding: The Case for Multiple Unicast Sessions", In Proc. of Allerton, Monticello, IL, USA, Sep. 2004, pp. 1-9.
"XORs in the Air: Practical Wireless Network Coding", ACM SIGCOMM Computer Communication Review, vol. 36, Issue 4 Oct. 2006, Proceedings of the 2006 conference on Applications, technologies, architectures, and protocols for computer communications, pp. 243-254.
Dong et al, "Practical Network Coding in Wireless Networks", Proceedings of the 13th annual ACM international conference on Mobile computing and networking, 2007, pp. 306-309.
Chaporkar et al, "Adaptive Network Coding and Scheduling for Maximizing Throughput in Wireless Networks", Proceedings of the 13th annual ACM international conference on Mobile computing and networking, 2007, pp. 135-146.
Zhang et al, "On Scheduling Vehicle-Roadside Data Access", Proceedings of the fourth ACM international workshop on Vehicular ad hoc networks, Quebec, Canada, 2007, pp. 9-18.
Lee et al, "CodeTorrent: Content Distribution Using Network Coding in VANET", Computer Science Dept, UCLA Network Research Lab, p. 1-19.
Ahmed et al, "VANETCODE: Network Coding to Enhance Cooperative Downloading in Vehicular Ad-Hoc Network", Proceedings of the 2006 international conference on Wireless communications and mobile computing, Vancouver, British Columbia, Canada, 2006, pp. 527-532.
"IEEE 802.21 Working Group", http://www.ieee802.org/21.
Ott et al, "Drive-thru Internet: IEEE 802.11b for Automobile Users", IEEE INFOCOM 2004,Mar. 7-11, 2004, pp. 1-12.
Hadaller et al, "MV-MAX: Improving Wireless Infrastructure Access for Multi-Vehicular Communication", Proceedings of the 2006 SIGCOMM workshop on Challenged networks, Pisa, Italy, 2006, pp. 269-276.

\* cited by examiner

STATEFUL SCHEDULING WITH NETWORK CODING FOR ROADSIDE-TO-VEHICLE COMMUNICATION

BACKGROUND

More and more vehicles are being equipped with communications capabilities, essentially providing intelligent vehicle communication scenarios. For example, maps and navigation information, current traffic data, advertisements and so forth may be presented to vehicle occupants via built in systems or add-on devices.

One communication scenario is directed towards having moving vehicles request and receive data from a wireless roadside access point (AP). However, because the wireless medium is shared among nearby vehicles, the overall transmission capacity is limited. As more and more vehicles communicate with such an access point, existing approaches have difficulties in achieving the required network throughput of each user.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which overall communications with mobile clients such as vehicles in a roadside-to-vehicle communication system are reduced, by using network coding and state information to combine different transmissions requested by mobile client recipients into a common set of data transmitted once. An access point determines state data corresponding to data already received at a recipient based upon a previous transmission. Based upon the state data, the access point combines (e.g., XORs) one set of data intended for the recipient with another set (or sets) of data intended for one or more other recipients, and transmitting the combined (encoded) data. Each recipient may then decode the data it needs from the combined data and the previously received state data that it retained.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a network coding scheme that is able to enhance the network capacity of a roadside access point, including handling communications as more vehicles communicate with that access point. To this end, a network coding scheme is employed between an access point and the receiving vehicles, wherein in general, network coding reduces the overall number of transmissions that are needed by having, when possible, a recipient vehicle use previously received encoded data (e.g., sent to another vehicle) with other received data to decode (e.g., via an XOR operation) packets.

In one example implementation, a stateful scheduling with network coding (SSNC) mechanism in the form of an example algorithm provides scheduling to fully utilize the states of received data of vehicles for enhanced network communications performance. In general and as described below, the exemplified stateful scheduling algorithm is configured to serve more than one vehicle (when appropriate) by integrating network coding within a communication (e.g., transmission) timeslot.

While the various examples herein are directed towards an implementation that uses an example algorithm/protocol, it is understood that these are only examples. For example, an example protocol is described that facilitates reliable roadside-to-vehicle communication, including when operating in highly-dynamic and/or error-prone wireless channels. However, it can be readily appreciated that alternative algorithms, coding schemes and/or protocols are feasible. Further, the technology described herein is application to other mobile networking scenarios and technology, such as mobile telephony and laptop computers, and/or other environments in which multiple clients request data from access points.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and wireless networking, including mobile networking, in general.

Figure 1:
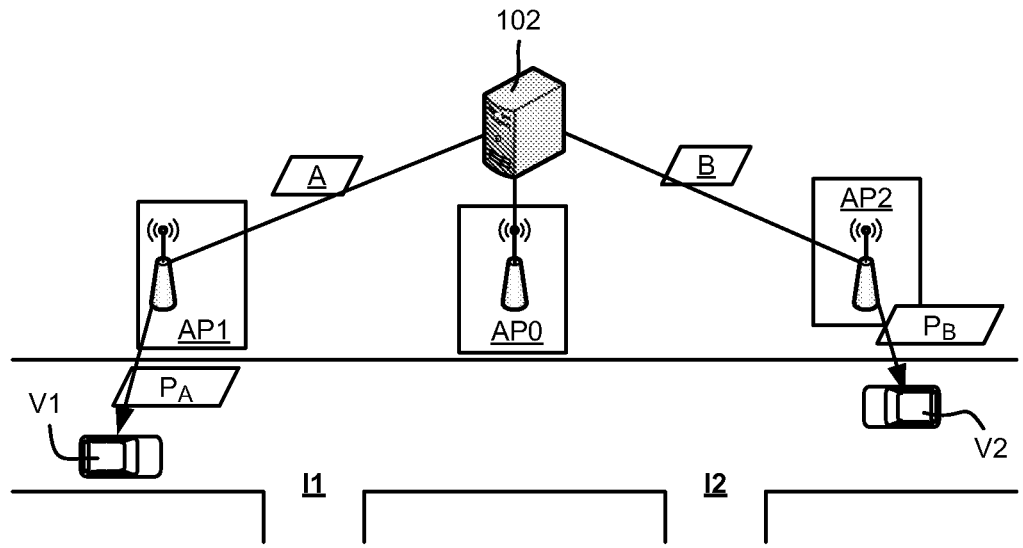
FIGS. 1 and 2 comprise block diagrams representing an example of using stateful scheduling with network coding to increase the throughput of vehicular network communications.

Turning to FIG. 1, there is shown a representation of one example approach to increase the throughput of vehicular network communications by stateful scheduling as described herein. For example, the data blocks (e.g., files) labeled A and B may comprise snapshot files setting forth traffic conditions about intersections I1 and I2, while data blocks PA and PB represent data packets formatted based upon the data in the blocks A and B.

In FIG. 1, a traffic information server 102 in the infrastructure network may store such snapshots, which for example may be updated at a time interval and are available via the access points AP0, AP1 and/or AP2 as vehicles move in the range of an appropriate one. In this manner, the vehicles V1 and V2 thus receive traffic conditions at the intersections I1 and I2 as packets PA and PB corresponding to the two files A and B. In this example, both vehicles V1 and V2 are interested in the file set {A, B} as they move along the same road, but in opposite directions. Based on their respective locations, the vehicle V1 downloads the contents of file A from the server 102 through AP1, while the vehicle V2 downloads the contents of the file B through AP2.

Figure 2:
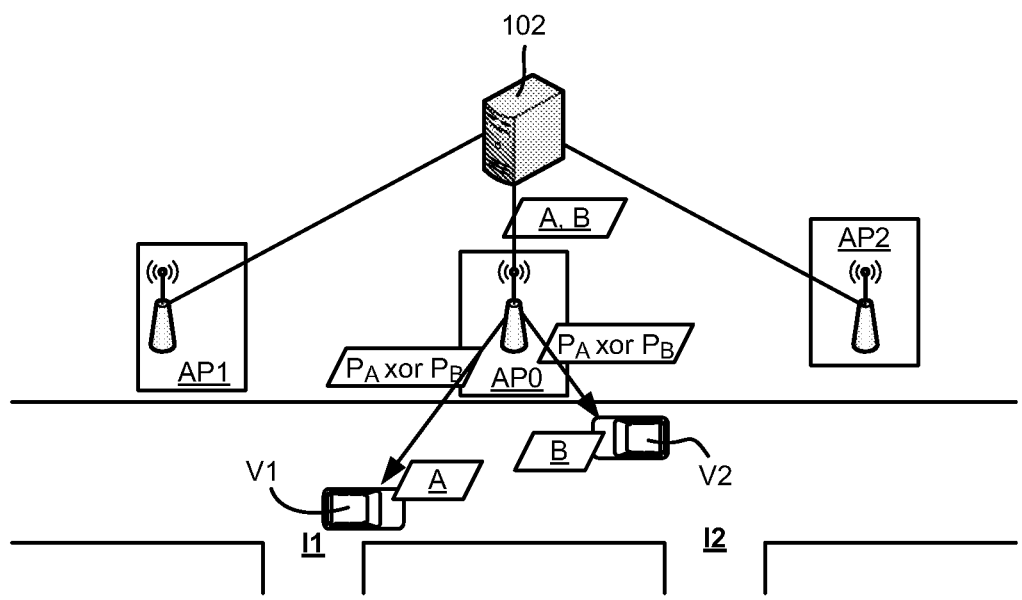

As described herein and as generally represented in FIG. 2, when the vehicles V1 and V2 move within the range of the access point AP0, vehicle V1 requests the file contents for file B, and vehicle V2 requests the file contents for A, from the access point AP0. With the stateful network scheduling described herein, when the access point AP0 is aware of the cache state of both vehicles, the access point AP0 does not need to separately serve the two files to the vehicles. Instead, the access point AP0 encodes (e.g., XORs) the packets corresponding to the files A and B, and then transmits the XOR-ed packets to the vehicles V1 and V2, where they are decoded using their respective previously cached packet data. Note that because of broadband connections between access points and such data servers, it is possible to rapidly compute and provide scheduled content to access points according to the predicted routes of vehicles.

As can be readily appreciated, because the files need not be separately retransmitted, with instead only a single encoded (XOR-ed) transmission representative of both files, the network throughput can be substantially increased, that is, increased network capacity in roadside-to-vehicle communication is achieved by exploiting the state information of vehicles. Moreover, the stateful scheduling scheme is able to further improve the performance of such vehicular networks when applied in conjunction with intelligent content distribution among access points.

One aspect to applying network coding to roadside-to-vehicle communication is directed towards maintaining fairness in service while applying aggressive network coding for capacity enhancement. As described below, to this end, one example implementation has an access point select a primary vehicle to serve, based upon a first-come-first-served policy. Thereafter, the scheduling scheme uses network coding to combine packets that are intended for other vehicles.

Another aspect is directed towards ensuring transmission reliability given the existence of error-prone wireless links. To this end, one example implementation adopts a unicast model for the transmission from the access point to the primary vehicle, whereby other vehicles can overhear the combined packet without acknowledgement. As described below, a subsequent acknowledgement (CF-Poll-SReq/CF-ACK-SRep) mechanism is described, which checks whether an intended vehicle correctly received the packet if and when that vehicle becomes the primary vehicle.

Turning to an example, consider that vehicles may have downloaded the common set of data files completely or partially. Before arriving at a certain access point, the vehicles have previously passed other access points and have thus downloaded some files or segments of a file upon requests. In this example, the remaining portion then requested from the current access point. In this scheme, the states with respect to what data was received in which vehicles is used for network coding thereby increasing throughput by stateful scheduling.

Figure 3:
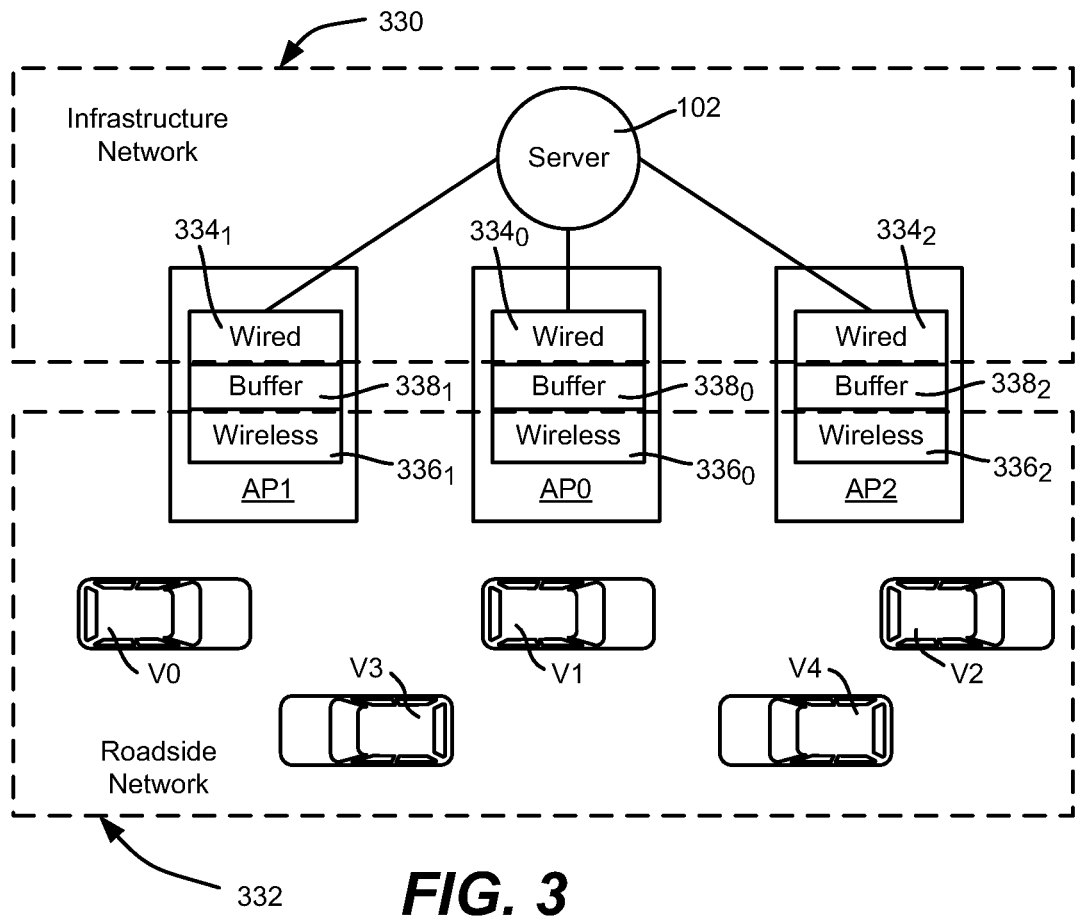
FIG. 3 is a block diagram representing an infrastructure network that is coupled to a roadside network via access points.

As shown in FIG. 3, one example system model for roadside-to-vehicle communication comprises a two-tier architecture, in which a roadside network 330 is overlaid with an infrastructure network 332. In this example, each access point AP0-AP2 has at least two interfaces, e.g., a wired (high bandwidth) interface $334_0$-$334_2$ that connects its respective access point AP0-AP2 to a server (such as the server 102 of FIG. 1) in the infrastructure network 330, and an 802.11-based wireless interface $336_0$-$336_2$ that connects its respective access point AP0-AP2 to the vehicles V0-V4 (any practical number may be present) in the roadside network 332.

In this exemplified system model, the server 102 provides vehicles with a particular service, typically delivering its service in the form of relatively small files or other data structures so that it can adapt to short-lived connections as the vehicles V0-V4 pass the access points AP0-AP2 at possibly high speed. Note that events are available by which the access points know when vehicles move in or out range, e.g., as produced link layer triggers or the like.

Communication of small amounts of data generally applies to services specific to vehicles, such as traffic information services, media rich advertisement services and/or roadside digital media entertainment services. Further, in this example the files on the server are delivered in sequence, with an incremental number (packet identifier, or pid) used to identify a packet within a file. Still further in this example, each service and each small file are associated with unique identifiers, e.g., a sid (service identifier) and a fid (file identifier), respectively. An sfid (service and file identifier) that combines a sid and fid may be used to denote a given file in a particular service.

The following table sets forth terms used in one example system based on stateful scheduling with network coding:

| Term | Definition |
| --- | --- |
| VIDv | The identifier of vehicle v, such as the MAC address |
| pid | An incremental number that identifies a packet in a file |
| sfid | An identifier that denotes a file in a particular service |
| Bv | A set of sfids that denote small files stored in the vehicle's buffer. Bv can be expressed as {sfid1, sfid2, . . . , sfidn} |
| Pv | A set of pids that denote packets received from the current downloading small file at vehicle v |
| Qv | A pointer to the virtual FIFO queue for vehicle v |
| SFIDv | The sfid of the small file that the AP currently schedules for the vehicle |
| SFp | <sid, pid> pairs listed in the SID-header of packet p |

Each access point (AP0-AP2) connects vehicles within its range to the server 102, and may work in various modes, including ad hoc or infrastructure modes. For 802.11 based roadside-to-vehicle communication, for example, an infrastructure mode with PCF (Point Coordination Function) operation may be a preferred alternative. In this alternative, packet transmissions to and from vehicles are scheduled by the access point.

An access point also may implement some functions in addition to scheduling at the MAC layer, e.g., when there is a mismatch between the bandwidth of the wired link to the server and that of the wireless link to vehicles, the access point may serve as a buffering point to mitigate the packet loss. Such a buffer (e.g., $338_0$-$338_2$) stores packets that are not acknowledged by vehicles. These packets can be classified into two types from the perspective of the access point, namely incoming packets received from the server and outgoing packets sent in encoded packets with network coding. To distinguish packet types, each packet is associated with a state on the access point. For an incoming packet, the state is set to NEW_PACKET. For an outgoing packet, the state is set to NC_PACKET. The access point may process packets at the application layer.

The vehicle may request a service when it passes through an access point. When this occurs, the vehicle receives files delivered from the server and stores them in an in-vehicle buffer for later decoding of the network coding-encoded packets received from the access point. In general, the requested and stored files at the vehicles are described herein in terms of reception state.

Figure 4:
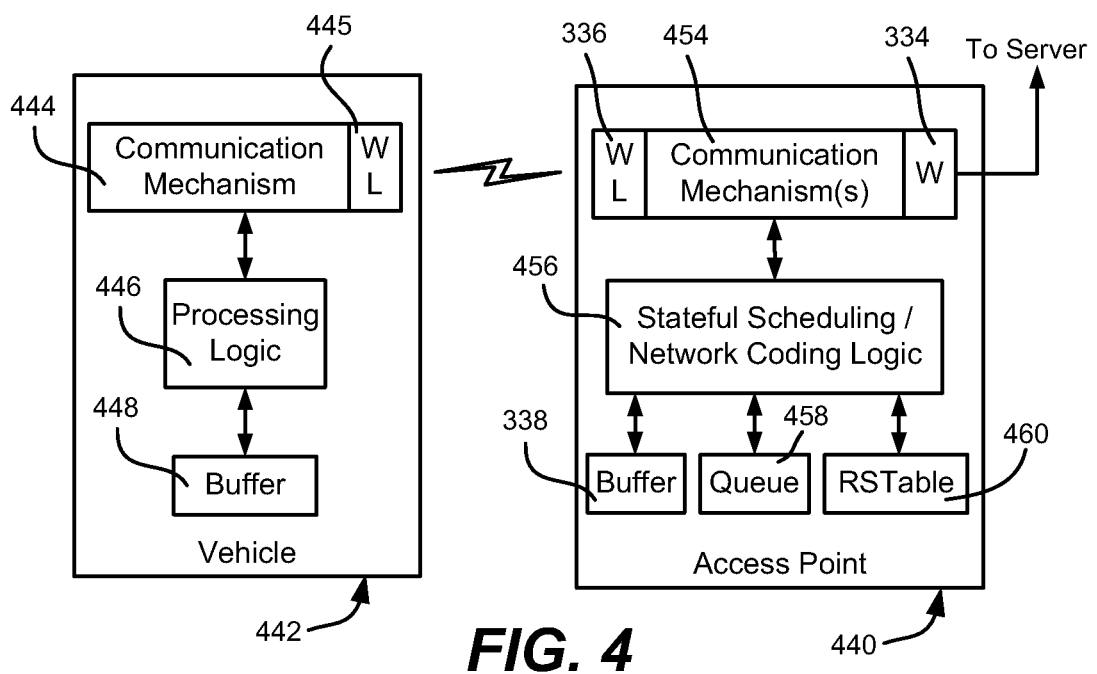
FIG. 4 is a block diagram showing example components in a mobile client and an access point.

Turning to an example protocol suitable for use in roadside-to-vehicle communication, as generally exemplified with reference to FIGS. 4-9, when an access point such as the access point 440 of FIG. 4 receives an event indicating that a new vehicle 442 has moved in its range, the access point 440 requests the reception state of the vehicle 442. For example, with 802.11-based PCF operation, the access point 440 sends a CF-Poll data structure (frame) 550 (FIGS. 5 and 6) to the vehicle 442 to indicate the request. As represented in FIG. 4, example vehicle components include a communication mechanism 444 with a wireless (WL) interface 445, processing logic 446 and a buffer 448. Example access point components include a communication mechanism 454 (e.g., including hardware and software) with a wireless interface 336 and wired (W) interface 334, stateful scheduling/network coding logic 456, a buffer 338, a queue 458 (e.g., one per vehicle) and a reception state table 460 (RSTable, described below).

Figure 5:
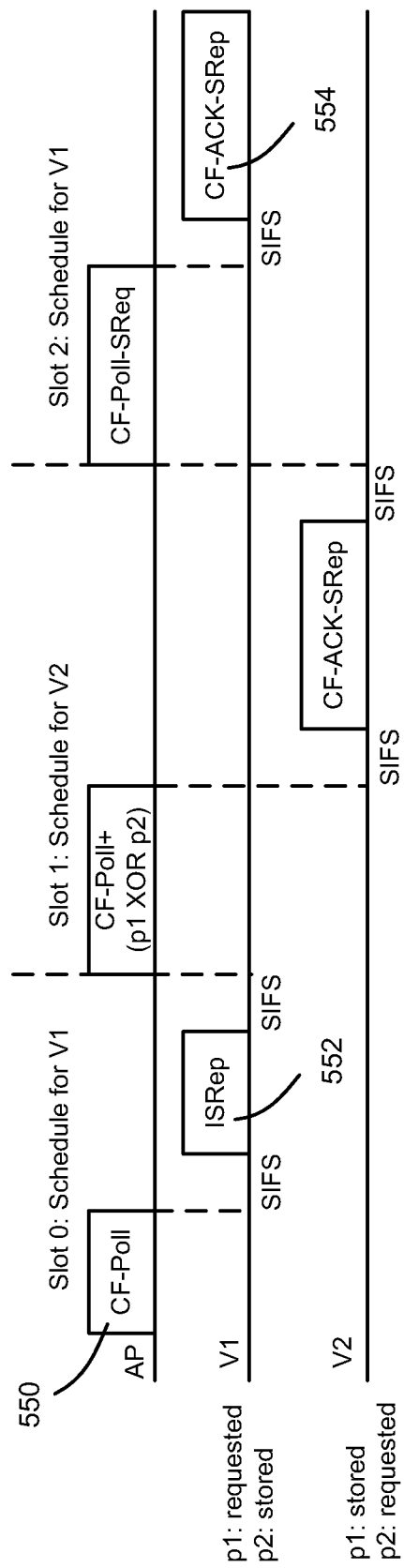
FIG. 5 is a timing diagram exemplifying protocol operation in one example roadside-to-vehicle system.

A representative example of protocol operation in the exemplified system is shown in FIG. 5. In this example, the access point 440 schedules transmissions for two vehicles. V1 is a new vehicle (e.g., corresponding to the vehicle 442) that moves into the range of the access point. The encoded packet (p1 XOR p2) is received and decoded by V1 and V2 in timeslot one (1). Thus, packet p2 is not transmitted for V2 in timeslot 2.

In general, the exemplified system modifies standard PCF operation in 802.11, including by defining formats, including messages that are used for an access point to acquire reception state data from vehicles, and an SID-header that is used for decoding at vehicles.

Figure 7:
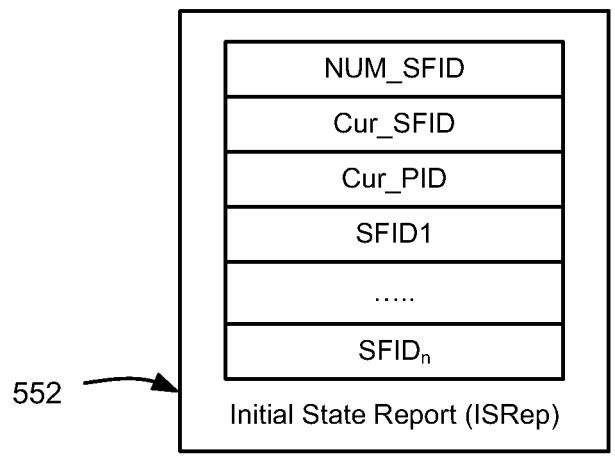

After receiving the CF-Poll data structure 550, the vehicle 442 responds with an Initial State Report (ISRep) 552 (FIGS. 5 and 7). The ISRep 552 contains the information of the current reception state at the vehicle, such as the state of the requested file as denoted by an <sfid, pid> pair, and any stored files as denoted by sfids. The access point 440 extracts the vehicle's reception state from the ISRep, and stores it as an entry in the RSTable 460 in association with an identifier of the vehicle 442.

More particularly, in one example implementation, each access point maintains an RSTable to track the data state of vehicles in that access point's range. When receiving an ISRep from a vehicle, the access point extracts the vehicle's reception state from the ISRep, and creates an entry in RSTable for that vehicle. One example structure of the entry (for a vehicle v) comprises VIDv, Bv, Qv, and SFIDv. The access point updates the RSTable when a CF-ACK-SRep from a vehicle indicates that the download of the requested file is finished. In this event, the sfid of the requested file is added to the vehicle's entry in the RSTable.

The ISRep 552 message is sent when a new incoming vehicle reports its reception state to the access point. As shown in FIG. 7, a <Cur_SFID, Cur_PID> pair identifies the packet that the vehicle requests to download at the next scheduling time. The length of the ISRep message is determined by the number of small files that are stored in the vehicle's buffer.

Figure 11:
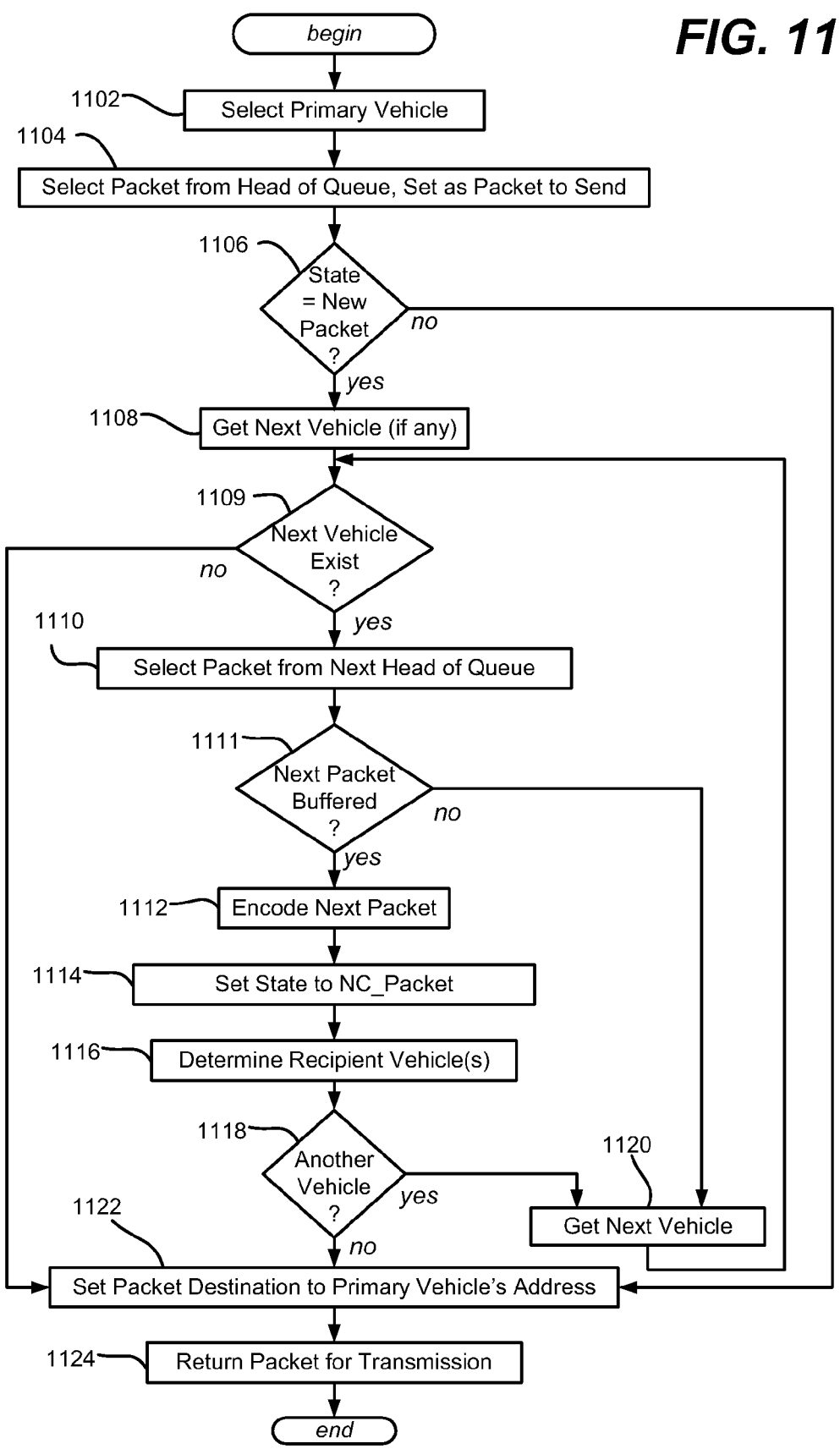
FIG. 11 is a flow diagram representing example steps taken by an access point to select and transmit data to mobile clients, including encoding the data when possible.

When scheduling a packet for a vehicle, based on whether the vehicle 442 is a primary vehicle as described below, the access point 440 may perform different scheduling schemes according to the state of the packet. For example, if the packet is in the state of NEW_PACKET, the access point 440 considers the packet as having never been transmitted. A greedy network coding scheme, described below with reference to FIG. 11, is used to search for other vehicles whose packets can be encoded by network coding. For reliability purposes, in one implementation the encoded packet is transmitted to the primary vehicle in unicast. An SFID-header is also inserted, listing <sid, pid> pairs of the packets that are encoded.

Figure 8:
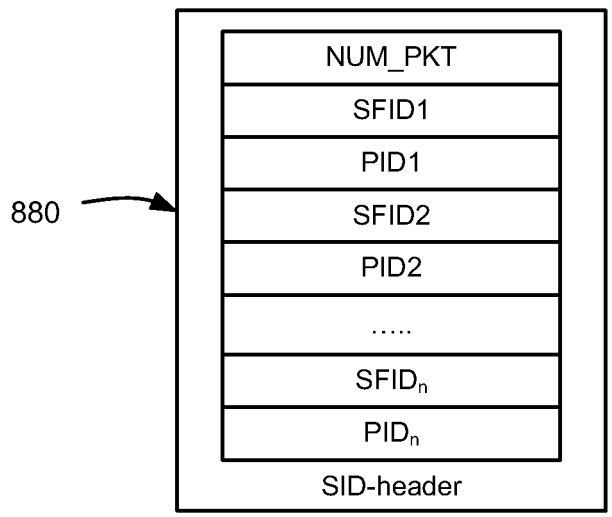

By operating in a promiscuous receiving mode, one or more intended vehicles will overhear the encoded packet and each can determine whether it can decode the packet based on the SFID-header 880 (FIG. 8). Note that only the primary vehicle sends an acknowledgement (e.g., CF-ACK). In one implementation, to reduce overhead, the CF-ACK acknowledgement also contains the information on the vehicle's reception state (the state of the requested file). In this event, the acknowledgement is used as a State Report (SRep) for the vehicle, and denoted as CF-ACK-SRep 554 (FIGS. 5 and 9).

Figure 6:
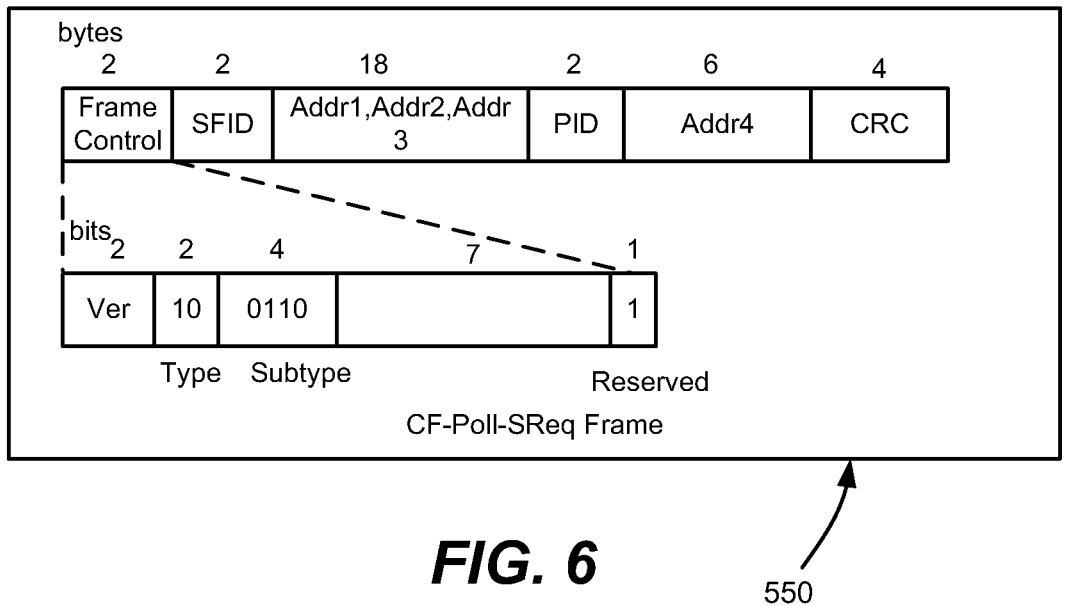
FIGS. 6-9 are example data structures used to communicate information in one example roadside-to-vehicle system.
Figure 9:
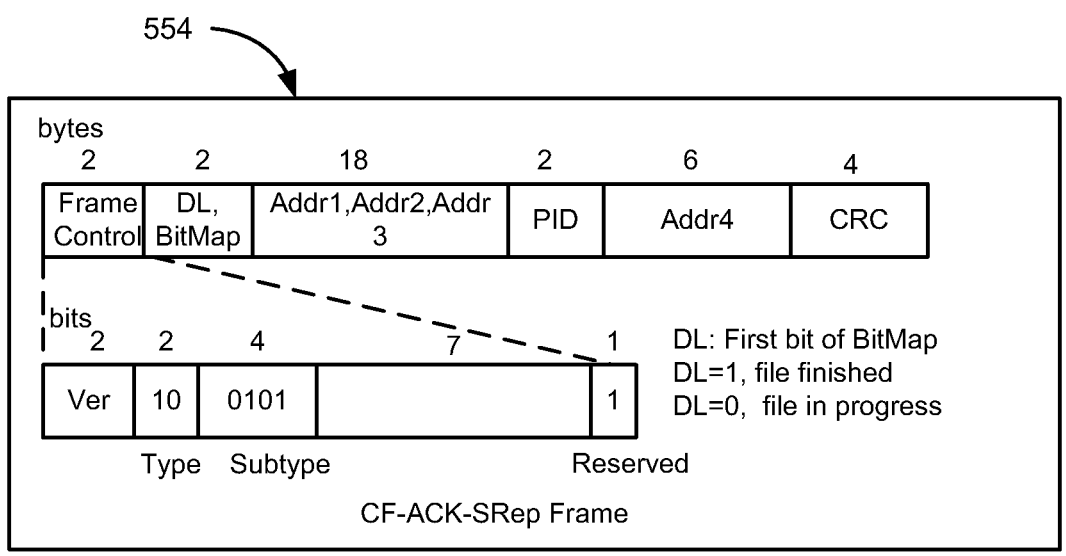

More particularly, in one implementation as shown in FIGS. 5, 6 and 9, when the reserved bit in frame control field is set to one (1), the CF-Poll and CF-ACK frames in 802.11 MAC are used to exchange the information of reception state between the AP and vehicles in the AP's range, which are denoted as CF-Poll-SReq and CF-ACK-SRep, respectively. In the CF-Poll-SReq, the SFID and PID fields are used to identify the scheduled packet that is in the state of NC_PACKET.

In the CF-ACK-SRep, the meaning of the SFPID field is determined by the first bit (i.e., the DL bit) of the BitMap field. When the download of the requested file has been finished, the DL bit is set to one (1). In this situation, the SFPID is set to the sfid of the requested file. Otherwise, the DL is set to zero (0), and the SFPID is set to the pid of the next packet that is expected by the vehicle. The remaining bits of the BitMap field indicate the current reception state of the file. For example, a CF-ACK-SRep with PID=100 and BitMap=0110000000000001 means that the next packet that the vehicle wants to download is the packet identified as 100, and it has already downloaded the packets identified as 102, 103 and 116.

The format of an example SID-header is shown in FIG. 8. It is a variable-length header that is inserted after the MAC header in each encoded packets, and is used to decode the encoded packet.

Figure 10:
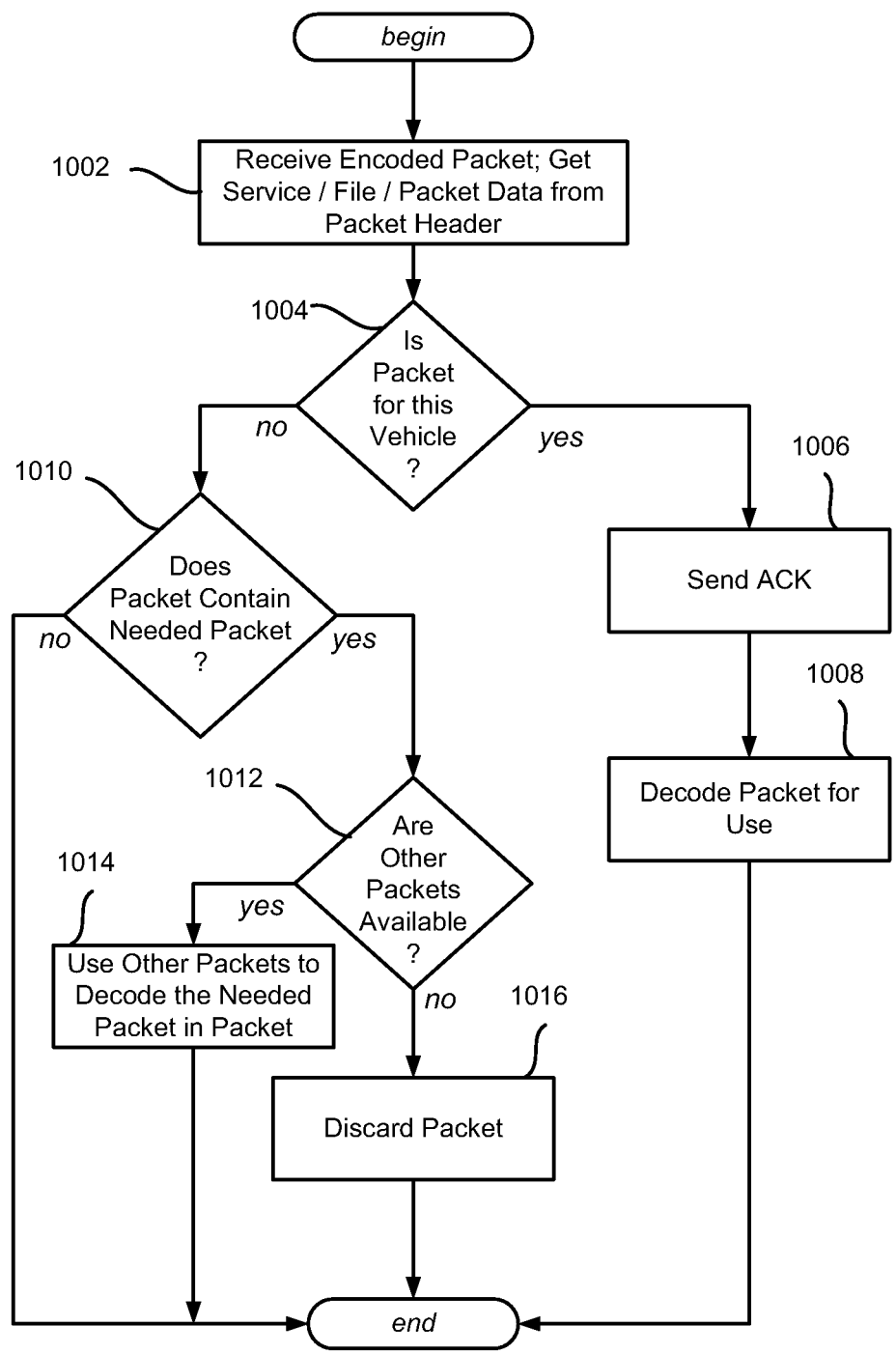
FIG. 10 is a flow diagram representing example steps taken by a mobile client recipient when receiving data.

FIG. 10 describes an example receiving process at the vehicle, as also set forth in the pseudo-code below, beginning at step 1002 where a packet is received and processed. In general, at step 1004 if the packet is intended for this vehicle, step 1006 sends an acknowledgement and step 1008 decodes the packet for use. If not directed towards this vehicle, (but picked up in promiscuous mode), step 1010 determines whether the packet can be used, and if so, whether all the other packets except for the needed packet are available (step 1012). If available, step 1014 uses previously received packets to decode the data of this packet and obtain the needed packet; otherwise the packet will be discarded (step 1016).

Receiving Process for Encoded Packets
  Vehicle v receives an encoded packet p
Procedures:
  sfid_header(p): Get <sid, pid> pairs listed in the
                    SFID-header of packet p -continued

```
   dst(p): Destination MAC address of packet p
   decode (p, SF_p): Decode packet p
1:   SF_p = sfid_header(p);
2:   if dst(p) = v
3:       decode(p, SF_p);
4:   else if ∃sf ∈ SF_p, sf.sfid == sfid(P_v)
                                    and sf.pid ∉ P_v
5:       if ∀sf' ∈ SF_p{sf} sf'.sid ∈ B_v
6:           decode(p, SF_p);
7:       endif
8:   endif
```

From the perspective of the access point, there is operated a greedy algorithm for stateful scheduling. The greedy algorithm aims to maximize the number of packets that are combined in an encoded packet, while ensuring that each intended vehicle can decode it with buffered data. In one example, because services are delivered to the vehicles in the form of small files, the greedy algorithm may be performed at the file-level granularity instead of the packet-level granularity, where the file information is used to reduce the computational complexity significantly. As described above, each AP maintains an RSTable for vehicles in its range and each item of the table is constructed based on the reception state of the vehicle.

In general, the greedy algorithm reads the state of the primary vehicle from the RSTable and then checks the state of the next vehicle. This process is repeated for other vehicles, that is, those in range except for the primary vehicle. Example steps of the algorithm are set forth in FIG. 11 and in the pseudo-code below:

```
Greedy Network Coding Scheme
   AP schedules packet p_v for vehicle v
Procedures:
   head(Q_v): Pick a packet at the head of virtual
                  queue Q_v
   head_new(Q_v): Pick the first packet in the state of
                  NEW_PACKET from virtual queue Q_v
   state(p_v): Get the state of packet p_v
   sfid(p_v): Get the sfid of packet p_v
   dst(p): Destination MAC address of packet p
1: p_v = head(Q_v);
2: p = p_v;
3: if state(p_v) == NEW_PACKET
4:    V = {v};
5:    v' = v->next;
6:    while v' != NULL do
7:       p_v' = head_new(Q_v');
8:       if p_v' != NULL
9:          if ∀vi∈V sfid(p_v') ∈ B_vi and sfid(p_vi) ∈ B_v'
10:            p = p⊕p_v';
11:            state(p_v') = NC_PACKET;
12:            V = V∪{v'};
13:         end if
14:      end if
15:      v' = v'->next;
16:   end while
17: end if
18: dst(p) = dst(p_v)
19: return p
```

In addition to the RSTable 460 described above, in order to perform the greedy network coding scheme, each access point also maintains a Virtual FIFO (First-in-First-Out) queue 458 (FIG. 4) for each vehicle in its range. For example, the virtual FIFO queue for a vehicle V1 (QV1) contains pointers to packets in the buffer whose destination is V1. The access point creates a virtual FIFO queue as a vehicle moves within its range and destroys it as the vehicle moves out of its range.

When scheduling, in one example, the access point first picks the primary vehicle (step 1102), which in one implementation is done according to a first-come-first-serve principle. Then the access point picks a packet from the head of the virtual FIFO queue of the vehicle (step 1104). If this is a new packet (step 1106), it will be encoded with the next packet (if any) selected for the next vehicle (if any) via steps 1108-1111, as appropriate. This process continues until no additional packet can be encoded. For example, if one vehicle is requesting packet A and has reported in its state data that is has packets B and C, and another vehicle is requesting packet B and has reported in its state data that that it has packets A and C, encoding will XOR packets A and B at step 112 and the state will be set to NC_packet at step 1114. Step 1116 determines recipients, and steps 1118 and 1120 repeat the process for other vehicles.

Step 1122 prepares the packet for sending to the primary vehicle, whether a NEW_PACKET or an NC_PACKET. Step 1124 returns the packet.

In sum, the access point searches for packets that can be encoded based on the state and sfid. If the packet is in the state of NC_PACKET, the packet has been transmitted in an encoded packet without acknowledgement. In this case, the access point exploits an on-demand CF-Poll-SReq/CF-ACK-SRep scheme to determine if the packet has already been received by the vehicle as generally represented in FIG. 5; the access point sends a CF-Poll (frame) to the vehicle. The CF-Poll is used as a State Request (SReq) for the vehicle and denoted as CF-Poll-SReq, which contains a <sfid, pid> pair instead of the actual scheduled packet. After receiving the CF-Poll-SReq, the vehicle responds with a CF-ACK-SRep. Then the access point receives and extracts the vehicle's reception state from the CF-ACK-SRep.

If the CF-ACK-SRep indicates that the scheduled packet has been received, the access point removes the packet from its buffer and schedules the next vehicle. Otherwise, it changes the state of the packet to NEW_PACKET and transmits the packet as described above.

Compared with the standard PCF operation, the on-demand CF-Poll-SReq/CF-ACK-SRep scheme may introduce an additional overhead. However, a CF-Poll-SReq is only sent when a packet in the state of NC_PACKET is scheduled, and the size of the CF-Poll-SReq and CF-ACK-SRep is relatively short, whereby the overhead is very small. Moreover, the scheme may be used to confirm previous reception as well as to request the reception state from vehicles.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   determining a primary recipient;
   determining state data corresponding to data already received at the primary recipient based upon a previous transmission, wherein the state data is determined by an algorithm at a file-level granularity, wherein determining the state data comprises communicating with the primary recipient from an access point, and wherein the access point maintains a reception state table configured to track a current data state of each vehicle within range of the access point;

receiving a second set of data at one other recipient;
combining, using XOR operation, a first set of data intended for the primary recipient and the second set of data intended for the one other recipient, based upon the state data, into encoded data;
transmitting the encoded data to the primary recipient;
receiving an acknowledgement of receipt of the encoded data from the primary recipient, wherein only the primary recipient transmits acknowledgements of receipt;
in response to a determination that the second set of data was not intended for the one other recipient, determining whether the second set of data can be used in a decoding process in conjunction with the first set of data previously received by the primary recipient; and
in response to a determination that the set of data can be used in a decoding process in conjunction with another set of data previously received by the recipient, performing the decoding process.

2. The method of claim 1 further comprising: sending the previous transmission from another access point.

3. The method of claim 1 further comprising: receiving information from a server, the information intended for vehicular recipients.

4. The method of claim 1 wherein combining comprises XOR-ing at least two sets of data.

5. The method of claim 1 further comprising: sending a new packet to a first recipient;
and changing state information associated with that new packet to indicate that the packet was sent.

6. The method of claim 1 further comprising: detecting a new potential recipient in range of an access point; and
communicating with the new potential recipient to obtain state data of that new potential recipient.

7. The method of claim 1 further comprising: communicating with the recipient to determine whether the encoded data was received by the recipient.

8. In a networking environment, a system comprising:
an access point, the access point configured to maintain a reception state table to track a current data of a plurality of mobile clients within range of the access point, the access point configured to communicate with the plurality of mobile clients, including to determine a primary mobile client of the plurality of mobile clients, to determine which set or sets of data each mobile client has previously received and which set of data each mobile client is requesting, wherein the sets of data is determined by an algorithm at a file-level granularity, the access point configured to:
combine, using XOR operation, a first set of data requested by the primary mobile client and a second set of data intended for one other mobile client, based upon the state data, into encoded data by which the respective mobile clients are able to decode the requested sets of data by using the sets of data that the respective mobile clients have previously received,
configured to transmit the common set of data to the mobile clients,
configured to receive an acknowledgment of receipt of the common set of data from the primary mobile client, wherein only the primary mobile client transmits acknowledgments or receipt;
in response to a determination that the second set of data was not intended for the one other mobile client, determining whether the second set of data can be used in a decoding process in conjunction with the first set of data previously received by the primary mobile client;
and in response to a determination that the second set of data can be used in a decoding process in conjunction with another set of data previously received by the primary mobile client, performing the decoding process.

9. The system of claim 8 wherein the access point is configured to maintain a data structure for each mobile client, wherein the data structure indicates the set or sets of data needed by each respective mobile client.

10. The system of claim 8 wherein the access point is configured to maintain a data structure for one or more of the plurality of the mobile clients, wherein the data structure tracks the set or sets of data previously received by each respective one or more of the plurality of the mobile clients.

11. The system of claim 8 wherein the access point couples an infrastructure network containing a server having vehicle-related information to a roadside network containing the plurality of mobile clients incorporated into vehicles.

12. The system of claim 8 wherein a mobile client of the plurality of mobile clients receives a given set of data, determines that the given set of data was intended for another mobile client of the mobile clients, and uses the given set of data in a decoding process in conjunction with another set of data previously received.

13. The system of claim 8 wherein the access point sends point coordination function-type message to one or more of the plurality of mobile clients, including a message communication by which the access point determines reception state data corresponding to which set or sets of data a given mobile client of the plurality of mobile clients has previously received.

14. The system of claim 8 wherein the access point communicates the set or sets of data to a particular mobile client of the plurality of mobile clients via a unicast communication and receives an acknowledgement only from the particular mobile client.

15. One or more computer storage devices having computer-executable instructions stored thereon, which in response to execution by a computer, cause the computer to perform steps, comprising:
communicating with a primary mobile client of a plurality of mobile clients that are within range of an access point, including obtaining state information from the primary mobile client that indicates what set or sets of previously-received data that the primary mobile client has retained, wherein the access point maintains a reception state table configured to track a current data state of each of the plurality of mobile clients within range of the access point, wherein the current data is determined by an algorithm at a file-level granularity;
combining, using XOR operation, a first set of data intended for the primary mobile client and the second set of data intended for the one other mobile client, based upon the state data, into encoded data;
communicating the combined set of data to the primary mobile client and to one other mobile client of the plurality of mobile clients, the combined set of data comprising data intended for the primary mobile client and the one other mobile client and being encoded such that the primary mobile client is capable of decoding the combined set of data into the data intended for the primary mobile client by using the set or sets of previously received data that the primary mobile client has retained;
and receiving an acknowledgment receipt of the combined set of data from the primary mobile client, wherein only the primary mobile client transmits acknowledgments of receipt;

in response to a determination that the second set of data was not intended for the one other mobile client, determining whether the second set of data can be used in a decoding process in conjunction with the first set of data previously received by the primary mobile client;

and in response to a determination that the second set of data can be used in a decoding process in conjunction with another set of data previously received by the primary mobile client, performing the decoding process.

16. The one or more computer storage devices of claim 15 having further computer-executable instructions stored thereon, which in response to execution by the computer, cause the computer to perform further steps comprising:

maintaining a data structure for each mobile client of the plurality of mobile clients that indicates the set or sets of data needed by each respective client, and maintaining a data structure for the plurality of clients that tracks the set or sets of data previously received by each respective client.

17. The one or more computer storage devices of claim 15 having further computer-executable instructions stored thereon, which in response to execution by the computer, cause the computer to perform further steps comprising:

receiving information from a server, the information including traffic-related data intended for vehicular recipients.

18. The one or more computer storage devices of claim 15 having further computer-executable instructions stored thereon, which in response to execution by the computer, cause the computer to perform further steps comprising:

tracking state information associated with data packets to determine whether each data packet was previously transmitted or is a new data packet that has not yet been transmitted, including changing the state information associated with a data packet in conjunction with transmitting that data packet.

* * * * *